(12) United States Patent
Kim et al.

(10) Patent No.: US 12,561,025 B2
(45) Date of Patent: Feb. 24, 2026

(54) TOUCH APPARATUS

(71) Applicant: HiDeep Inc., Seongnam-si (KR)

(72) Inventors: Seyeob Kim, Seongnam-si (KR);
Jongsik Kim, Seongnam-si (KR);
Hwanhee Lee, Seongnam-si (KR);
Hyoungwook Woo, Seongnam-si (KR);
Kiryoung Jung, Seongnam-si (KR);
Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 247 days.

(21) Appl. No.: 18/225,264

(22) Filed: Jul. 24, 2023

(65) Prior Publication Data

US 2023/0367422 A1      Nov. 16, 2023

Related U.S. Application Data

(63) Continuation of application No. 16/744,429, filed on Jan. 16, 2020, now abandoned.

(30) Foreign Application Priority Data

Feb. 1, 2019     (KR) ........................ 10-2019-0014045

(51) Int. Cl.
*G06F 3/041*          (2006.01)
*G06F 3/044*          (2006.01)

(52) U.S. Cl.
CPC ........ *G06F 3/0418* (2013.01); *G06F 3/04162* (2019.05); *G06F 3/04166* (2019.05);
(Continued)

(58) Field of Classification Search
None
See application file for complete search history.

(56) References Cited

U.S. PATENT DOCUMENTS 10,013,128 B2   7/2018   Zou
10,379,694 B2   8/2019   Park et al.
(Continued)

FOREIGN PATENT DOCUMENTS

CN         105045437        11/2015
CN         105389064         3/2016
(Continued)

OTHER PUBLICATIONS

JP-2000075959-A (English translation) (Year: 2000).*
KR-19990077439-A (English translation) (Year: 1999).*

*Primary Examiner* — Dorothy Harris
(74) *Attorney, Agent, or Firm* — LEX IP MEISTER, PLLC

(57)          ABSTRACT

An exemplary embodiment of the present invention provides a touch apparatus including: a touch panel including a plurality of first touch electrodes arranged in a first direction and a plurality of second touch electrodes arranged in a second direction crossing the first direction; a driver configured to apply a first driving signal to the first touch electrodes during a first period and a second driving signal to the second touch electrodes during a second period subsequent to the first period; a receiver configured to receive a detection signal from the second touch electrodes during the first period, and a detection signal from the first touch electrodes and the second touch electrodes during a third period subsequent to the second period; and a controller configured to determine a touch position based on the signal outputted from the receiver.

17 Claims, 20 Drawing Sheets

(52) U.S. Cl.
CPC .......... *G06F 3/0442* (2019.05); *G06F 3/0445*
(2019.05); *G06F 3/0446* (2019.05); *G06F*
*2203/04104* (2013.01)

(56) References Cited

U.S. PATENT DOCUMENTS

| | | | | |
|---|---|---|---|---|
| 11,150,764 B2 * | 10/2021 | Kim | ...................... | G06F 3/0441 |
| 11,314,361 B2 * | 4/2022 | Kim | ...................... | G06F 3/0441 |
| 11,327,582 B2 * | 5/2022 | Kim | ................... | G06F 3/03546 |
| 11,556,208 B2 * | 1/2023 | Kim | ................... | G06F 3/04166 |
| 2012/0068964 A1 * | 3/2012 | Wright | ................. | G06F 3/0442 |
| | | | | 345/174 |
| 2015/0242043 A1 * | 8/2015 | Oda | ...................... | G06F 3/0446 |
| | | | | 345/174 |
| 2015/0355767 A1 * | 12/2015 | Abe | ...................... | G06F 3/0446 |
| | | | | 345/174 |
| 2016/0062519 A1 * | 3/2016 | Park | ...................... | G06F 3/0446 |
| | | | | 345/173 |
| 2016/0378208 A1 * | 12/2016 | Shahparnia | ........... | G06F 3/0442 |
| | | | | 345/173 |
| 2017/0003804 A1 * | 1/2017 | Sung | ................... | G02F 1/13338 |
| 2017/0068344 A1 * | 3/2017 | Bhandari | .............. | G06F 3/0442 |
| 2017/0108982 A1 * | 4/2017 | Shigehiro | ........... | G06F 3/04184 |
| 2017/0344150 A1 | 11/2017 | Zou | | |
| 2018/0113559 A1 * | 4/2018 | Bae | ................... | G06F 3/03545 |
| 2019/0056803 A1 * | 2/2019 | Nussbaum | ........... | G06F 3/0383 |

FOREIGN PATENT DOCUMENTS

| | | | | | |
|---|---|---|---|---|---|
| JP | 2000075959 A | * | 3/2000 | ........... | A61F 13/476 |
| KR | 19990077439 A | * | 10/1999 | | |

* cited by examiner

Prior Art

FIG. 16

TOUCH APPARATUS

CROSS-REFERENCE TO RELATED APPLICATION

This application is a Continuation Application of U.S. patent application Ser. No. 16/744,429 filed on Jan. 16, 2020, which claims priority to and benefits of Korean Patent Application No. 10-2019-0014045 filed in the Korean Intellectual Property Office on Feb. 1, 2019, the entire contents of which are incorporated herein by reference.

BACKGROUND OF THE INVENTION

(a) Field of the Invention

The present disclosure relates to a touch apparatus.

(b) Description of the Related Art

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

Conventionally, amplifiers corresponding to each of the touch electrodes are provided in the touch sensor in order to receive detection signals from the touch electrodes included in the touch sensor.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments have been made in an effort to provide a touch apparatus for receiving a detection signal from which a noise component has been removed.

Exemplary embodiments have been made in an effort to provide a touch apparatus for calculating a position of a touch input between two adjacent touch electrodes.

Exemplary embodiments have been made in an effort to provide a touch apparatus that detects inputs by different touch objects with different periods within one frame.

For achieving the objects or other objects, an aspect of the present invention provides a touch apparatus including: a touch panel including a plurality of first touch electrodes arranged in a first direction and a plurality of second touch electrodes arranged in a second direction crossing the first direction; a driver configured to apply a first driving signal to the first touch electrodes during a first period and a second driving signal to the second touch electrodes during a second period subsequent to the first period; a receiver configured to receive a detection signal from the second touch electrodes during the first period, and a detection signal from the first touch electrodes and the second touch electrodes during a third period subsequent to the second period; and a controller configured to determine a touch position based on the signal outputted from the receiver.

The driver may sequentially apply a pulse signal of a first frequency to the first touch electrodes as the first driving signal during the first period.

The receiver may include an amplifier connected to each of the second touch electrodes during the first period to amplify and output a detection signal from a corresponding second touch electrode.

The driver may apply a pulse signal of a second frequency that is higher than or equal to a first frequency to both first touch electrodes and second touch electrodes as a second driving signal during the second period.

The receiver may receive a detection signal from both the first touch electrodes and the second touch electrodes during the third period.

The driver may not apply the second driving signal to the first touch electrodes and the second touch electrodes during the third period.

The receiver may include a plurality of differential amplifiers that simultaneously receive detection signals from both the first touch electrodes and the second touch electrodes during the third period.

A plurality of differential amplifiers may receive only a third detection signal generated by the second touch object in response to the second driving signal during the second period.

The controller may determine the third detection signal as a valid touch signal based on whether signal strength of the third detection signal exceeds a second threshold.

The differential amplifiers may include: a first differential amplifier configured to receive detection signals from two first touch electrodes spaced by at least one first touch electrode; and a second differential amplifier configured to receive detection signals from two second touch electrodes spaced by at least one second touch electrode.

The detection signal may include at least one of a first detection signal generated by a first touch object and a second detection signal generated by a second touch object.

The controller may determine a detection signal as a valid touch signal based on whether a signal strength of the detection signal received in response to the first driving signal exceeds a first threshold during the first period, and the first detection signal may be determined as a valid touch signal, while the first threshold may be set to filter the second detection signal.

The first touch object may include at least one of a finger and a palm, while the second touch object may be a stylus pen.

An exemplary embodiment of the present invention provides a touch apparatus including: a touch panel including a plurality of first touch electrodes arranged in a first direction and a plurality of second touch electrodes arranged in a second direction crossing the first direction; a driver configured to apply a first driving signal to the first touch electrodes during a first period and a second driving signal to the second touch electrodes during a second period subsequent to the first period; a plurality of differential amplifiers configured to receive a detection signal from the first touch electrodes and the second touch electrodes during a third period subsequent to the second period; and the controller configured to determine a touch position based on the signal outputted from the differential amplifiers.

The differential amplifiers may simultaneously receive detection signals from both the first touch electrodes and the second touch electrodes during the third period.

The driver may not apply the second driving signal to the first touch electrodes and the second touch electrodes during the third period.

A plurality of differential amplifiers may receive only a third detection signal generated by the second touch object in response to the second driving signal during the second period.

The third detection signal may be determined as a valid touch signal based on whether signal strength of the third detection signal exceeds a second threshold.

The differential amplifiers may include: a first differential amplifier configured to receive detection signals from two first touch electrodes spaced by at least one first touch electrode; and a second differential amplifier configured to receive detection signals from two second touch electrodes spaced by at least one second touch electrode.

The detection signal may include at least one of a first detection signal generated by a first touch object and a second detection signal generated by a second touch object.

Each of the first differential amplifiers of the differential amplifiers may be connected to each of the second touch electrodes during the first period to amplify and output a detection signal from a corresponding second touch electrode, the controller may determine a detection signal as a valid touch signal based on whether a signal strength of the detection signal received in response to the first driving signal exceeds a first threshold during the first period, and the first detection signal may be determined as a valid touch signal, while the first threshold may be set to filter the second detection signal.

The first touch object may include at least one of a finger and a palm, while the second touch object may be a stylus pen.

A frequency of the first drive signal may be less than or equal to that of the second drive signal.

According to the exemplary embodiments, it is possible to improve reception sensitivity of the touch input.

According to the exemplary embodiments, it is possible to accurately calculate touch positions.

According to the exemplary embodiments, it is possible to accurately detect inputs by different touch objects.

BRIEF DESCRIPTION OF THE DRAWINGS

FIG. 16 illustrates a graph showing magnitudes of the reception signals of FIGS. 12 and 14.

DETAILED DESCRIPTION OF THE EMBODIMENTS

Figure 1:
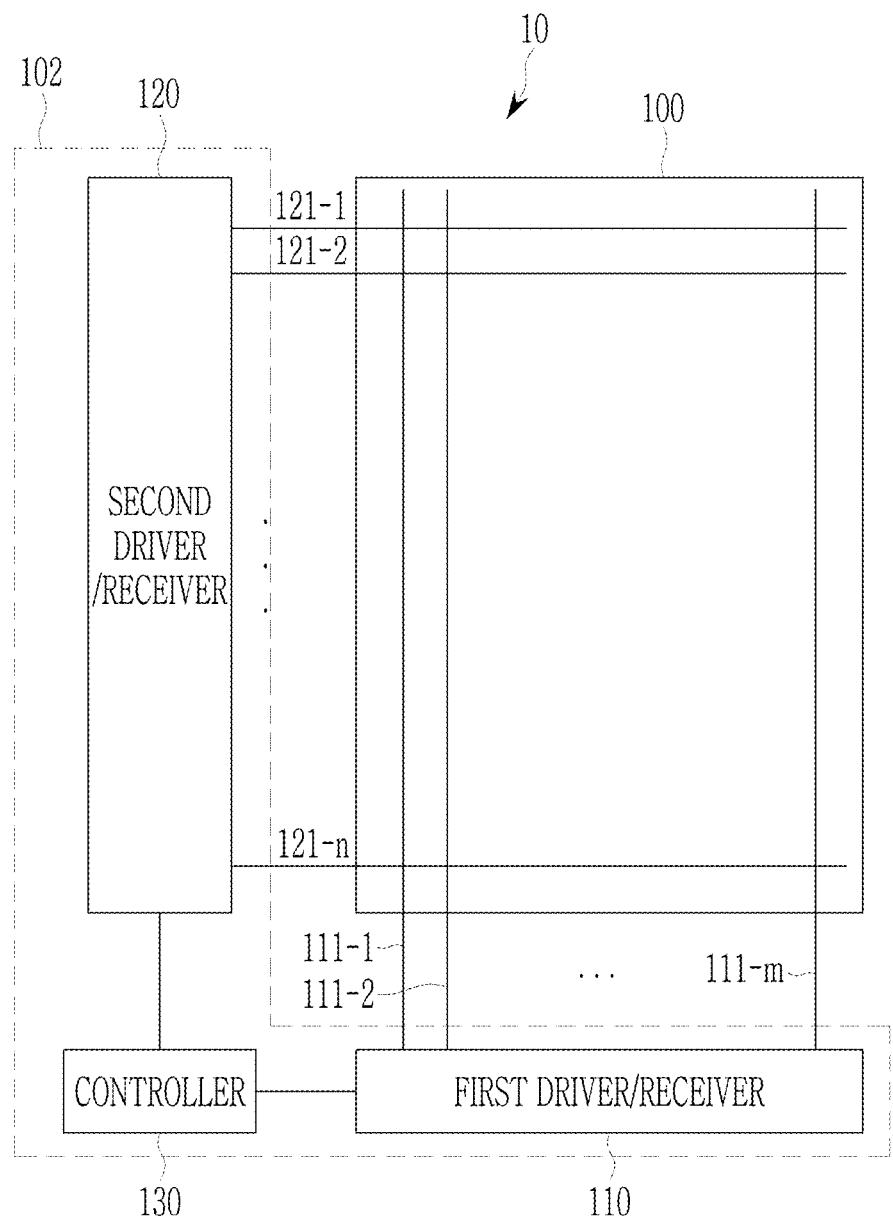
FIG. 1 schematically illustrates a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent elements shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Hereinafter, a touch apparatus and a touch detection method thereof according to exemplary embodiments will be described with reference to necessary drawings.

Figure 2:
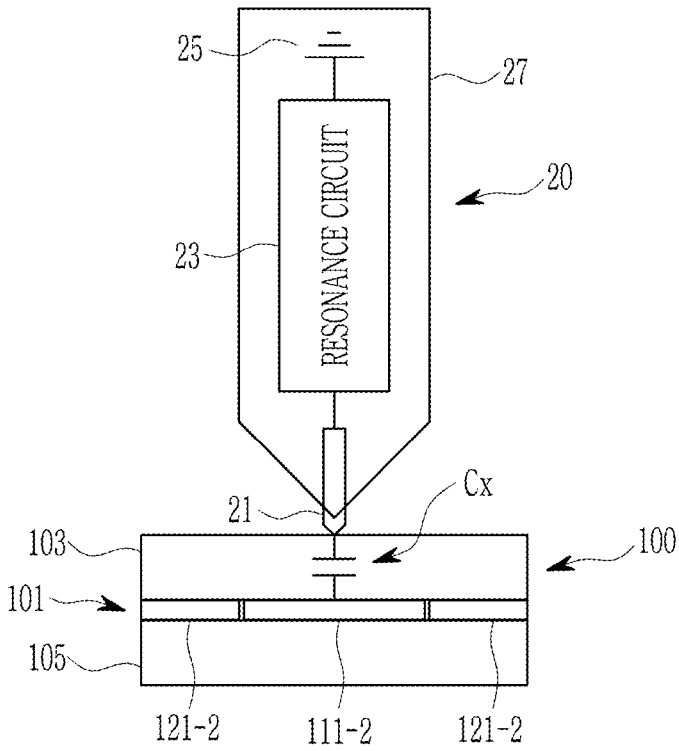
FIG. 2 illustrates an example in which a stylus pen is touched on a touch apparatus according to an exemplary embodiment.

FIG. 1 schematically illustrates a touch apparatus according to an exemplary embodiment, and FIG. 2 illustrates an example in which a stylus pen is touched on a touch apparatus according to an exemplary embodiment.

Referring to FIG. 1, the touch apparatus 10 according to an exemplary embodiment includes a touch panel 100 and a touch controller 102 for controlling the touch panel 100. The touch controller 102 may include first and second driver/ receivers 110 and 120 and a controller 130 for transmitting and receiving a signal to and from the touch panel 100.

The touch panel 100 includes a plurality of first touch electrodes 111-1 to 111-*m* having a form extending in a first direction, and a plurality of second touch electrodes 121-1 to 121-*n* having a form extending in a second direction crossing the first direction. In the touch panel 100, the first touch electrodes 111-1 to 111-*m* may be arranged along the second direction, and the second touch electrodes 121-1 to 121-*n* may be arranged along the first direction. In FIG. 1, a shape of the touch panel 100 is illustrated as a quadrangle, but the present invention is not limited thereto.

As illustrated in FIG. 2, the touch panel 100 further includes a substrate 105 and a window 103. The first touch electrodes 111-1 to 111-*m* and the second touch electrodes 121-1 to 121-*n* may be disposed on the substrate 105. The window 103 may be disposed on the first touch electrodes 111-1 to 111-*m* and the second touch electrodes 121-1 to 121-*n*. In FIG. 2, the first touch electrodes 111-1 to 111-*m* and the second touch electrodes 121-1 to 121-*n* are illustrated to be disposed on a same layer 101, but may be on different layers, respectively, and the present invention is not limited thereto.

The first touch electrodes 111-1 to 111-*m* are connected to the first driver/receiver 110, and the second touch electrodes 121-1 to 121-*n* are connected to the second driver/receiver 120. In FIG. 1, the first driver/receiver 110 and the second driver/receiver 120 are separated from each other, but may be implemented as one module, unit, or chip, and the present invention is not limited thereto.

The first driver/receiver 110 may apply a driving signal to the first touch electrodes 111-1 to 111-*m*. In addition, the first driver/receiver 110 may receive a detection signal from the first touch electrodes 111-1 to 111-*m*. Similarly, the second driver/receiver 120 may apply a driving signal to the second touch electrodes 121-1 to 121-*n*. In addition, the second driver/receiver 120 may receive a detection signal from the first touch electrodes 121-1 to 121-*n*. That is, the first driver/receiver 110 and the second driver/receiver 120 may be a type of transceiver for transmitting and receiving signals, and each may include a driver and a receiver.

The driving signal may include a signal (e.g., a sine wave, a square wave, etc.) having a frequency corresponding to a resonant frequency of a stylus pen 20. The resonance frequency of the stylus pen 20 depends on a design value of a resonant circuit portion 23 of the stylus pen.

The touch apparatus 10 may be used to detect a touch input (direct touch or proximity touch) by a touch object. As illustrated in FIG. 2, the touch input of the stylus pen 20 proximate to the touch panel 100 may be sensed by the touch apparatus 10.

The stylus pen 20 may include a conductive tip 21, the resonant circuit portion 23, a ground 25, and a body 27.

The conductive tip 21 may be at least partially formed of a conductive material (e.g., a metal, a conductive rubber, a conductive fabric, a conductive silicon, etc.), and may be electrically connected to the resonant circuit portion 23.

The resonant circuit portion 23, which is an LC resonant circuit, may resonate with a driving signal applied from at least one of the first driver/receiver 110 and the second driver/receiver 120 to at least one kind of all electrodes among the first touch electrodes 111-1 to 111-*m* and the second touch electrodes 121-1 to 121-*n* through the conductive tip 21.

A resonance signal generated when the resonant circuit portion 23 resonates with the driving signal may be outputted to the touch panel 100 through the conductive tip 21. The driving signal caused by the resonance of the resonant circuit portion 23 may be transferred to the conductive tip 21 during a period in which the driving signal is applied to at least one kind of all electrodes among the first touch electrodes 111-1 to 111-*m* and the second touch electrodes 121-1 to 121-*n* and during a following period. The resonant circuit portion 23 may be disposed in the body 27, and may be electrically connected to the ground 25.

The stylus pen 20 in this manner generates a touch input by generating a resonance signal in response to a driving signal applied to at least one of the touch electrodes 111-1 to 111-*m* and 121-1 to 121-*n*.

Capacitance Cx is generated by at least one of the touch electrodes 111-1 to 111-*m* and 121-1 to 121-*n*, and the conductive tip 21 of the stylus pen 20. The driving signal and the resonance signal may be respectively transferred to the stylus pen 20 and the touch panel 100 through the capacitance Cx generated by at least one of the touch electrodes 111-1 to 111-*m* and 121-1 to 121-*n*, and the conductive tip 21 of the stylus pen 21.

The touch apparatus 10 may detect a touch by a touch object (e.g., a user's body (finger, palm, etc.), a passive or active stylus pen) other than the stylus pen 20 using the above-described method of generating the resonance signal.

For example, the touch apparatus 10 detects a touch by a stylus pen that receives an electrical signal and outputs it as a magnetic field signal. For example, the touch apparatus 10 may further include a digitizer. A touch may be detected by detecting the magnetic field signal that is electromagnetically resonant (or electromagnetically induced) by the stylus pen by the digitizer. Alternatively, the touch apparatus 10 detects a touch by a stylus pen which receives a magnetic field signal and outputs it as a resonant magnetic field signal. For example, the touch apparatus 10 may further include a coil for applying a current as a driving signal and the digitizer. The stylus pen resonates with a magnetic field signal generated by the coil to which the current is applied. A touch may be detected by detecting the magnetic field signal that is electromagnetically resonant (or electromagnetically induced) by the stylus pen by the digitizer.

The controller 130 may control driving of the touch apparatus 10, and may output touch coordinate information in response to a touch detection result of the touch apparatus 10.

Next, a touch detection method according to an exemplary embodiment of the present invention will be described with reference to FIG. 3.

Figure 3:
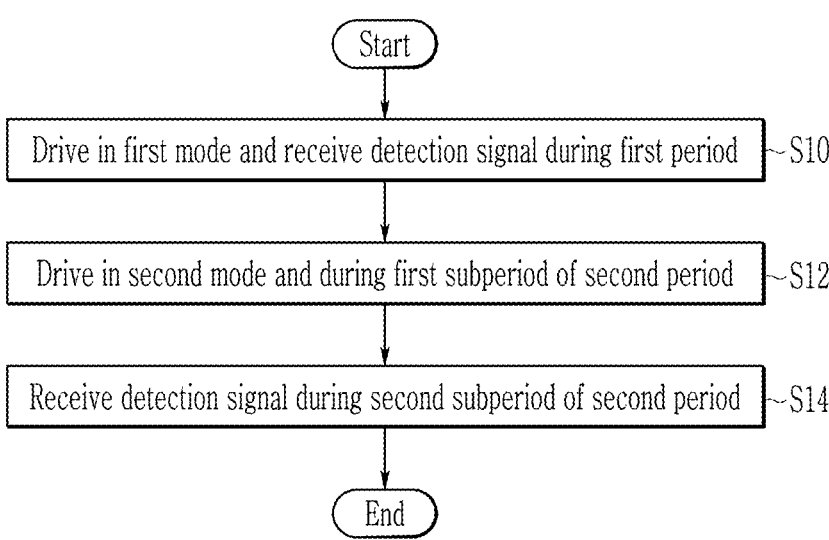
FIG. 3 schematically illustrates a touch detection method according to an exemplary embodiment.

FIG. 3 schematically illustrates a touch detection method according to an exemplary embodiment.

In a first period, the touch apparatus 10 is driven in a first mode (S10). The first mode is a mode in which a driving signal for detecting a touch input by a touch object other than the stylus pen 20 is applied to the touch panel 100.

For example, in the first mode, the first driver/receiver 110 outputs a driving signal to the first touch electrodes 111-1 to 111-*m*, and the second driver/receiver 120 receives a detection signal depending on a touch from the second touch electrodes 121-1 to 121-*n*.

The controller 130 may determine whether the detection signal is a valid touch signal based on whether a signal magnitude of the detection signal acquired during the first period exceeds a first threshold, and may obtain touch coordinate information by using the valid touch signal.

For example, the controller 130 calculates touch coordinates by using the detection signal when the signal magnitude of the detection signal acquired during the first period exceeds the first threshold. The controller 130 does not calculate touch coordinates depending on the detection signal having a signal magnitude that is less than or equal to the first threshold when the signal magnitude of the detection signal acquired in the first period is less than or equal to the first threshold. In addition, when the signal magnitude of the detection signal acquired in the first period exceeds the first threshold, the controller 130 may calculate a touch area by using the detection signal. The detection signal acquired in the first period includes at least one of a first detection signal caused by a user's body part (a finger, a palm, etc.), and a second detection signal caused by the stylus pen 20 or a passive stylus pen. The first threshold may be set such that the first detection signal is determined to be a valid touch signal and the second detection signal is filtered.

During a first subperiod of a second period, the touch apparatus 10 is driven in a second mode (S12). The second mode is a mode in which a driving signal for detecting a touch input by the stylus pen 20 is applied to the touch panel 100. For example, the first driver/receiver 110 simultaneously applies a driving signal to all of the first touch electrodes 111-1 to 111-m.

Although it has been described above that the first driver/receiver 110 simultaneously applies driving signals to all of the plurality of first touch electrodes 111-1 to 111-m during the first subperiod, the second driver/receiver 120 may simultaneously apply driving signals to all of the plurality of second touch electrodes 121-1 to 121-n during the second period, or the first driver/receiver 110 and the second driver/receiver 120 may simultaneously apply driving signals to all of the plurality of first touch electrodes 111-1 to 111-m and the driving signals to all of the second touch electrodes 121-1 to 121-n. When the first driver/receiver 110 and the second driver/receiver 120 provide driving signals to both the plurality of first touch electrodes 111-1 to 111-m and the plurality of second touch electrodes 121-1 to 121-n, it is assumed that phases of the driving signals applied to the first touch electrodes 111-1 to 111-m and the driving signals applied to the second touch electrodes 121-1 to 121-n are the same, but the present invention is not limited thereto.

It is assumed that a frequency of the driving signal applied to the touch panel 100 during the first period is equal to or less than a frequency of the driving signal applied to the touch panel 100 during the first subperiod.

During a second subperiod of the second period, the touch apparatus 10 receives a resonated detection signal based on the driving signal (S14).

For example, the resonant circuit portion 23 of the stylus pen 20 resonates with the drive signal, thereby generates a resonant signal, which is transferred to the touch panel 100 through the conductive tip 21. Then, the first driver/receiver 110 receives detection signals transferred from the first touch electrodes 111-1 to 111-m, and the second driver/receiver 120 receives detection signals transferred from the second touch electrodes 121-1 to 121-n. The first driver/receiver 110 and the second driver/receiver 120 may process the received detection signals to transfer them to the controller 130.

The controller 130 may determine whether the detection signal is a valid touch signal based on whether a signal magnitude of the detection signal acquired during the second subperiod exceeds a second threshold, and may obtain touch coordinate information related to a point where a touch of the stylus pen 20 occurs by using the valid touch signal.

For example, the controller 130 calculates touch coordinates by using the detection signal when a signal magnitude of the detection signal acquired during a third period exceeds the second threshold. The controller 130 does not calculate touch coordinates depending on the detection signal having a signal magnitude that is less than or equal to the second threshold when the signal magnitude of the detection signal acquired in the third period is less than or equal to the second threshold. In addition, when the signal magnitude of the detection signal acquired in the third period exceeds the second threshold, the controller 130 may calculate a touch area by using the detection signal.

Next, a driving signal applied in the first and second periods and a resonance signal of the stylus pen 20 will be described with reference to FIG. 4.

Figure 4:
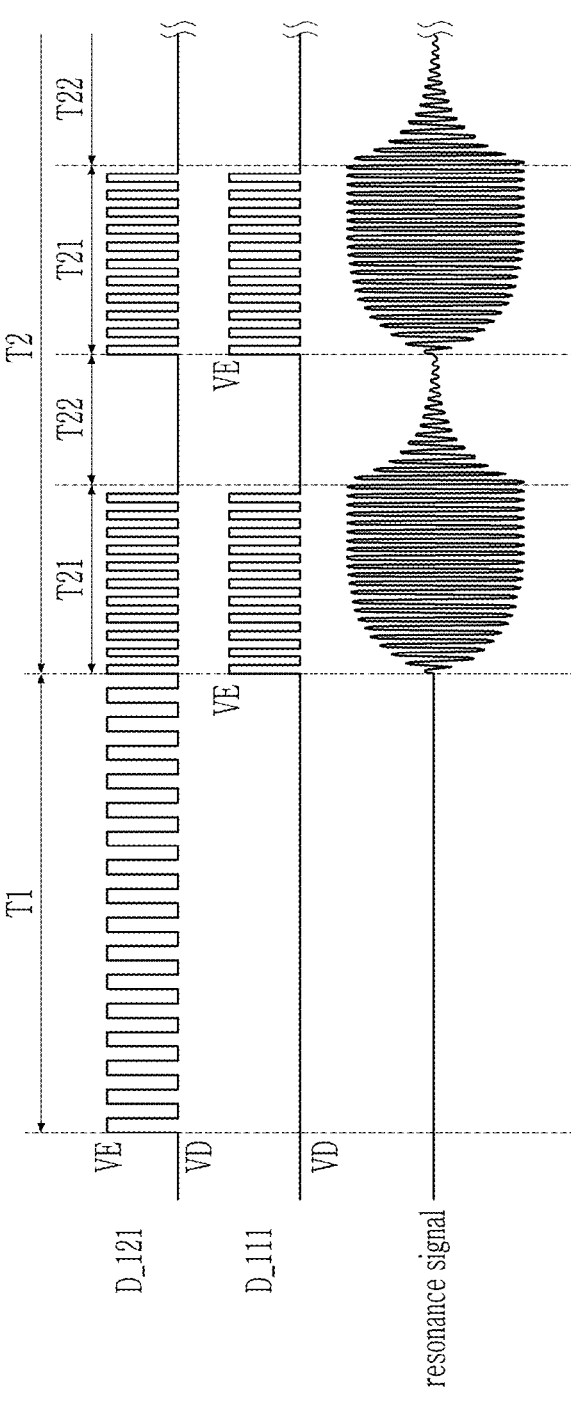
FIG. 4 illustrates a waveform diagram showing an example of a driving signal according to the touch detection method of FIG. 3.

FIG. 4 illustrates a waveform diagram showing an example of a driving signal according to the touch detection method of FIG. 3.

During the first period T1, the first driver/receiver 110 outputs a driving signal to at least one kind of touch electrodes among the first touch electrodes 111-1 to 111-m and the second touch electrodes 121-1 to 121-n. When the first driver/receiver 110 outputs a driving signal to the first touch electrodes 111-1 to 111-m, the second driving and receiving 120 may receive detection signals from the second touch electrodes 121-1 through 121-n. The controller 130 may obtain touch coordinate information based on a signal magnitude of the detection signal.

During the first subperiod T21 in the second period T2, the first driver/receiver 110 simultaneously applies a driving signal to the first touch electrodes 111-1 to 111-m, and the second driver/receiver 120 simultaneously applies a driving signal to the second touch electrodes 121-1 to 121-n.

During the first subperiod 21, a frequency of the driving signal applied to the first touch electrodes 111-1 to 111-m and the second touch electrodes 121-1 to 121-n correspond to a resonance frequency of the stylus pen 20. For example, the frequency of the driving signal outputted to the first touch electrodes 111-1 to 111-m and the second touch electrodes 121-1 to 121-n during the first subperiod T21 may be a frequency within an offset of 25 kHz to about 500 kHz. In contrast, during the first period T1, the frequency of the driving signal outputted to the first touch electrodes 111-1 to 111-m is set differently from the resonance frequency of the stylus pen 20. For example, the frequency of the driving signal outputted to the first touch electrodes 111-1 to 111-m during the first period T1 may be set to about 150 kHz. The frequency setting of the driving signal is merely an example, and may be set to a value different from the above.

During the first subperiod T22 in the second period T2, the first driver/receiver 110 receives detection signals from the first touch electrodes 111-1 to 111-m, and the second driver/receiver 120 receives detection signals from the second touch electrodes 121-1 to 121-n.

Even after application of the driving signal is completed during the second subperiod T22, a resonance signal outputted by the resonant circuit portion 23 of the stylus pen 20 may be received by at least one of the first touch electrodes 111-1 to 111-m and the second touch electrodes 121-1 to 121-n.

The second period T2 includes a plurality of first subperiods T21 and second subperiods T22. For example, during the second period T2, a combination of the first subperiod T21 and the second subperiod T22 may be repeated eight times.

Although the second period T2 exists after the first period T1, the first period T1 may exist after the second period T2, and time lengths of the first period T1 and the second period T2 may be changed in various frames, respectively, and the driving method of the touch apparatus 10 according to the exemplary embodiment is not limited thereto.

Next, a detection signal when a touch is inputted between two adjacent touch electrodes will be described with reference to FIG. 5 to FIG. 8.

Figure 5:
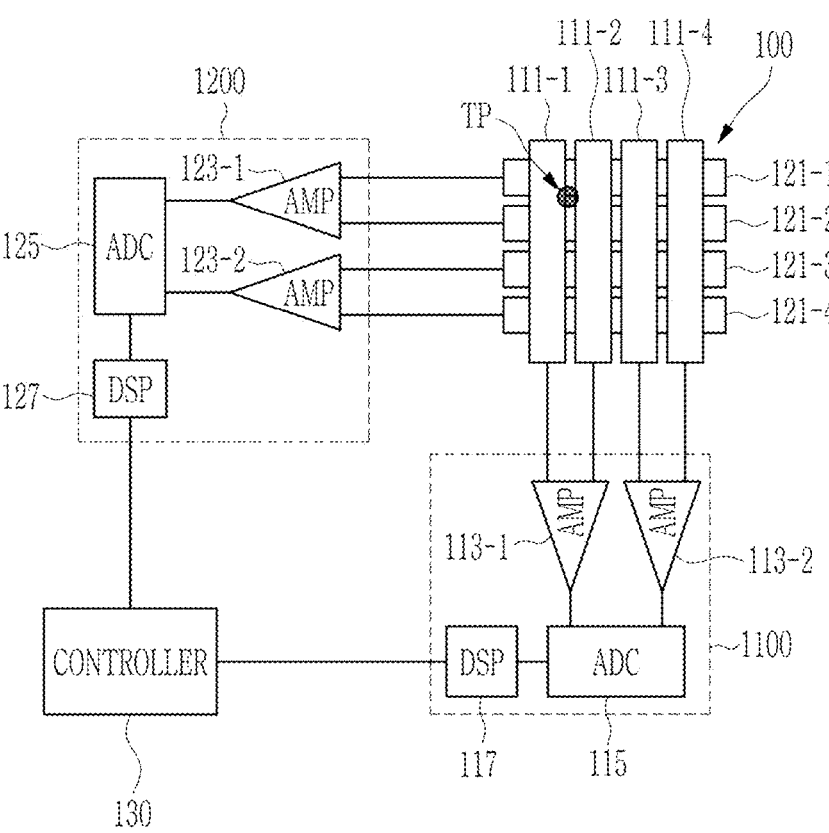
FIG. 5 partially illustrates a touch panel and a receiver according to a conventional art.
Figure 6:
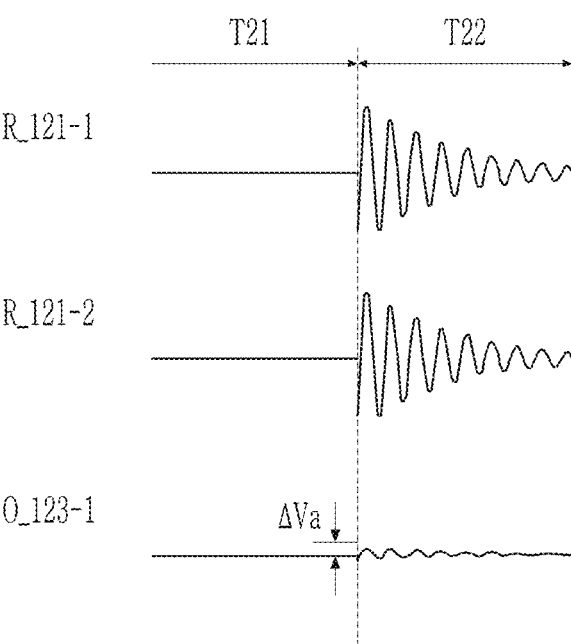
FIG. 6 illustrates a waveform diagram showing an example of a reception signal received by two electrodes of the touch panel shown in FIG. 5.
Figure 7:
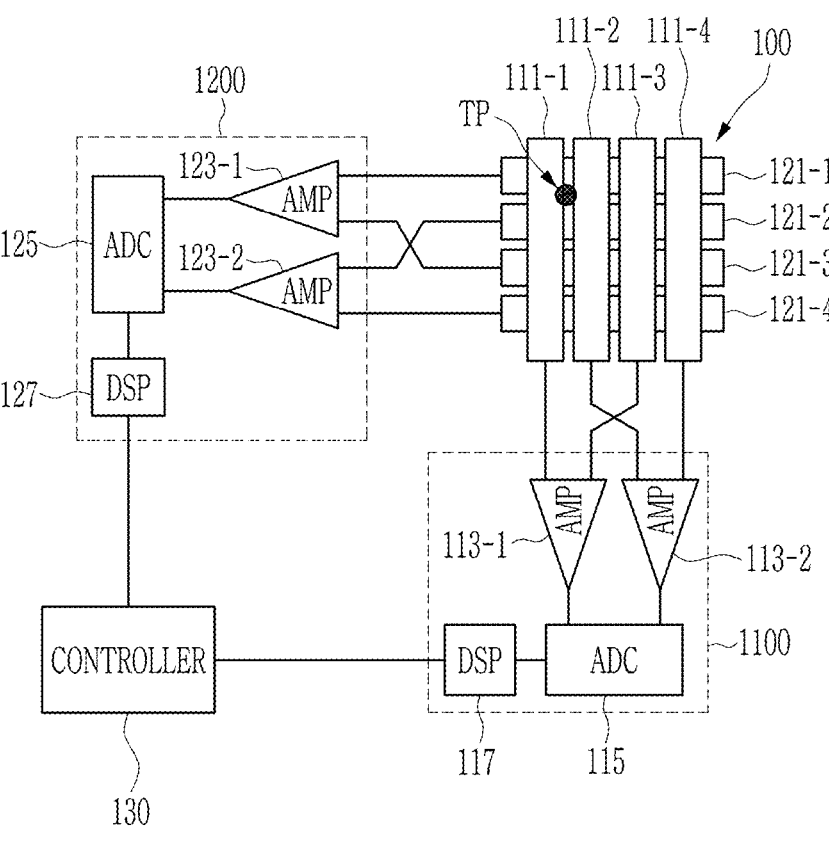
FIG. 7 partially illustrates a touch panel and a driver according to an exemplary embodiment.
Figure 8:
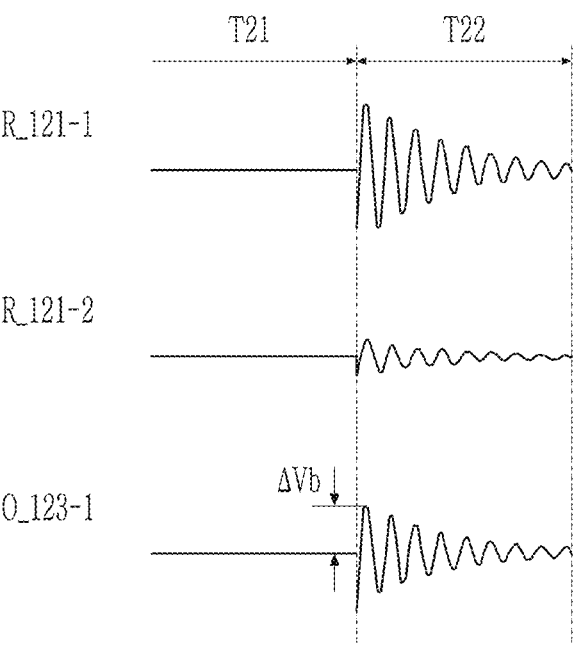
FIG. 8 illustrates a waveform diagram showing an example of a reception signal received by two electrodes of the touch panel shown in FIG. 7.

FIG. 5 partially illustrates a touch panel and a receiver according to a conventional art, FIG. 6 illustrates a waveform diagram showing an example of a reception signal received by two electrodes of the touch panel shown in FIG. 5, FIG. 7 partially illustrates a touch panel and a driver according to an exemplary embodiment, and FIG. 8 illustrates a waveform diagram showing an example of a reception signal received by two electrodes of the touch panel shown in FIG. 7.

First, as illustrated in FIG. 5, a first receiver 1100 of the first driver/receiver 110 includes a plurality of differential amplifiers 113-1 and 113-2, an ADC unit 115, and a digital signal processor (DSP) 117. A second receiver 1200 of the second driver/receiver 120 includes a plurality of differential amplifiers 123-1 and 123-2, an ADC unit 125, and a digital signal processor (DSP) 127.

Specifically, the differential amplifiers 113-1 and 113-2 and 123-1 and 123-2, may be implemented as amplifiers each having two input terminals, a first terminal of which receives one detection signal and a second terminal of which receives another detection signal.

In general, the signal received from the touch electrode not only receives a desired signal, but also receives noise. This noise deteriorates the quality of the signal, thereby reducing the sensitivity of the system, and in the case of display noise on a display, the noise is introduced into all channels at a similar magnitude. Therefore, when a difference between the detection signals received by the two touch electrodes is amplified, noise components may cancel each other, and only the difference between the signals may be amplified, thereby obtaining good quality signals.

Input terminals of the differential amplifiers 113-1 and 113-2, and 123-1 and 123-2, are connected to two adjacent touch electrodes, respectively. Specifically, the differential amplifier 113-1 is connected to the first touch electrodes 111-1 and 111-2 adjacent to each other, and the differential amplifier 113-2 is connected to the first touch electrodes 111-3 and 111-4 adjacent to each other. The differential amplifier 123-1 is connected to the second touch electrodes 121-1 and 121-2 adjacent to each other, and the differential amplifier 123-2 is connected to the second touch electrodes 121-3 and 121-4 adjacent to each other.

Each of the differential amplifiers 113-1 and 113-2, and 123-1 and 123-2, may differentially amplify and output two detection signals transferred from the touch electrodes connected with the input terminals.

In FIG. 5, when one point TP between two adjacent touch electrodes 111-1 and 111-2 is touched, the differential amplifier 113-1 connected to the two touch electrodes 111-1 and 111-2 amplifies a difference between the two detection signals. The controller 130 determines whether the detection signals from the two touch electrodes 111-1 and 111-2 are valid touch signals by using the signal outputted by the differential amplifier 113-1. However, since the detection signals received from the two touch electrodes 111-1 and 111-2 are the same in magnitude, or are very similar, the signal outputted by the differential amplifier 113-1 has a very small magnitude.

As illustrated in FIG. 6, during the second subperiod T22, the detection signals R_111-1 and R-111-2 from the two touch electrodes 111-1 and 111-2 have similar magnitudes and phases. Therefore, a signal O_113-1 outputted by the differential amplifier 113-1 has a very small signal magnitude $\Delta Va$. Therefore, a touch input for one point TP is difficult to detect.

When the differential amplifier 113-1 receives the detection signals from two adjacent touch electrodes, the detection signals generated by the touch in a region between the first touch electrode 111-1 and the first touch electrode 111-2 are not sufficiently large even if they are differentially amplified by the differential amplifier 113-1. Therefore, when the differential amplifier 113-1 is connected with two adjacent touch electrodes, touch sensitivity is deteriorated.

As illustrated in FIG. 7, the input terminals of the respective differential amplifiers 113-1 and 113-2, and 123-1 and 123-2, are connected to two touch electrodes that are spaced apart from each other by at least one touch electrode. Specifically, the differential amplifier 113-1 is connected to the first touch electrodes 111-1 and 111-3 that are spaced apart from the first touch electrode 111-2, and the differential amplifier 113-2 is connected to the first touch electrodes 111-2 and 111-4 that are spaced apart from the first touch electrode 111-3. The differential amplifier 123-1 is connected to the second touch electrodes 121-1 and 121-3 that are spaced apart from the second touch electrode 121-2, and the differential amplifier 123-2 is connected to the second touch electrodes 121-2 and 121-4 that are spaced apart from the second touch electrode 121-2.

In FIG. 7, when one point TP between two adjacent touch electrodes 111-1 and 111-2 is touched, the differential amplifier 113-1 connected to the two touch electrodes 111-1 and 111-3 amplifies a difference between the two detection signals. The controller 130 determines whether the detection signals from the two touch electrodes 111-1 and 111-3 are valid touch signals by using the signal outputted by the differential amplifier 113-1. However, since the signal magnitudes between the detection signals received from the two touch electrodes 111-1 and 111-3 are different, the signal outputted by the differential amplifier 113-1 may have a magnitude that is greater than or equal to a threshold.

As illustrated in FIG. 8, during the second subperiod T22, the detection signals R_111-1 and R-111-2 from the two touch electrodes 111-1 and 111-2 have different magnitudes. Therefore, the signal O_113-1 outputted by the differential amplifier 113-1 has a signal magnitude $\Delta Vb$ that is equal to or greater than the threshold. That is, since the differential amplifier 113-1 receives the detection signals from the first touch electrode 111-1 and the first touch electrode 111-3 which are spaced apart from each other by at least one touch electrode, the detection signal generated by the touch electrode at the touch input position may be differentially amplified to have a sufficiently large value, and the touch sensitivity may be improved.

Next, the first and second driver/receivers 110 and 120 of the touch apparatus 10 will be described in detail with reference to FIG. 9 and FIG. 11.

Figure 9:
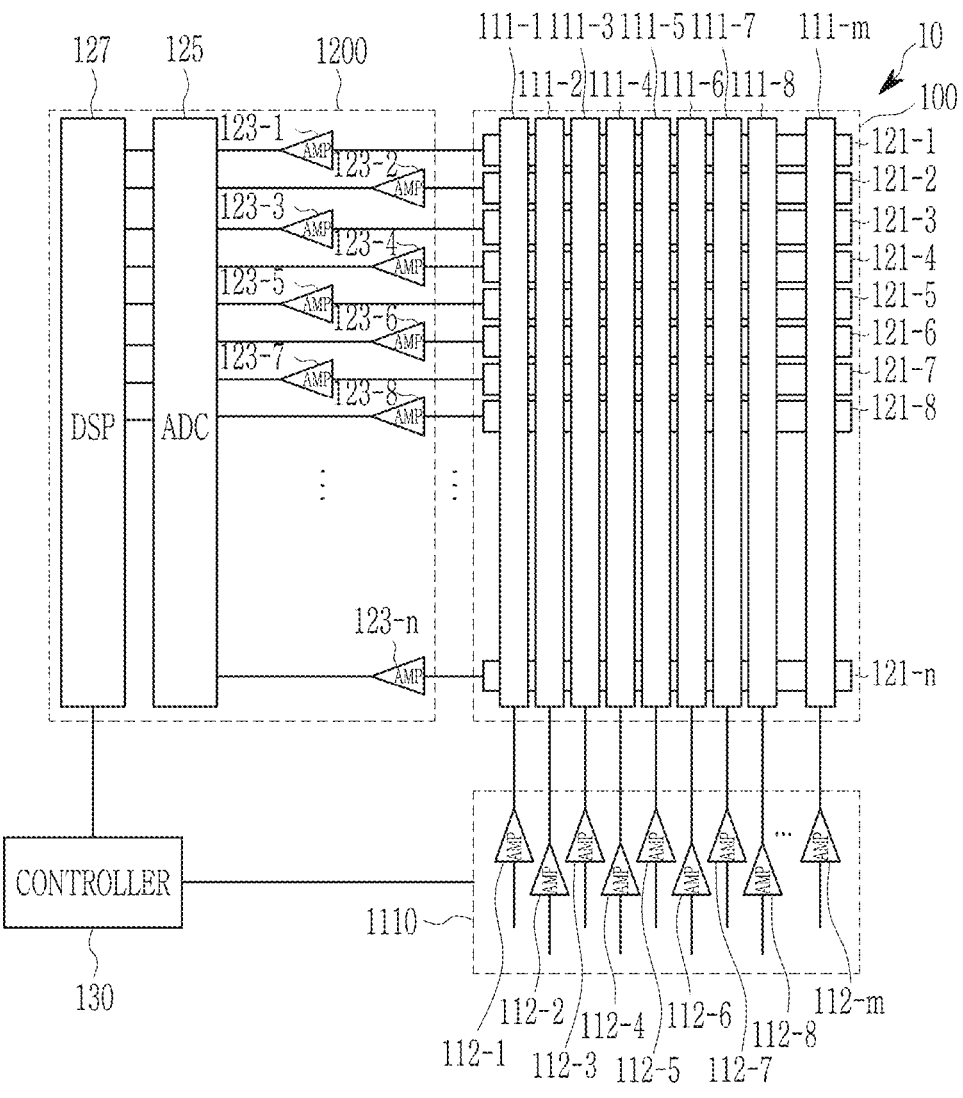
FIG. 9 to FIG. 11 illustrate the touch apparatus of FIG. 1 in more detail.
Figure 10:
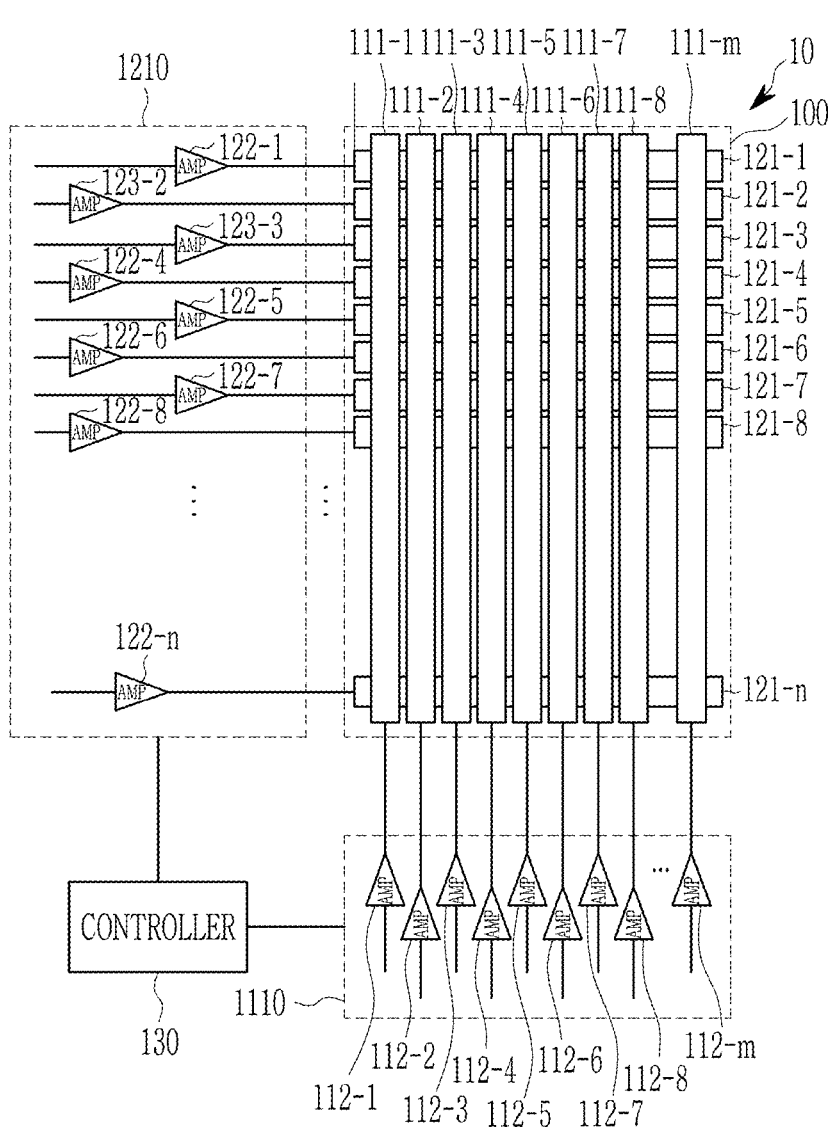

FIG. 9 illustrates a touch apparatus that operates during the first period T1 in more detail.

First, FIG. 9 illustrates a touch apparatus during the first period. As illustrated, a first driver 1110 of the first driver/receiver 110 includes a plurality of amplifiers 112-1 to 112-$m$. The amplifiers 112-1 to 112-$m$ are connected to the first touch electrodes 111-1 to 111-$m$ to output a first driving signal.

A second driver 1200 includes a plurality of amplifiers 123-1 to 123-$n$, an ADC unit 125, and a digital signal processor (DSP) 127. The second driver/receiver 1200 may sequentially receive detection signals of the second touch electrodes 121-1 to 121-$n$ in units of one second touch electrode. Alternatively, the second driver/receiver 1200 may simultaneously receive detection signals from the second touch electrodes 121-1 to 121-*n*.

Each of the amplifiers 123-1 to 123-*n* is connected to a corresponding second touch electrode of the second touch electrodes 121-1 to 121-*n*. Specifically, each of the amplifiers 123-1 to 123-*n* may be implemented as an amplifier in which one input terminal of two input terminals is connected to a ground or a DC voltage, and a detection signal is inputted into the other input terminal. Each of the amplifiers 123-1 to 123-*n* amplifies the detection signals transferred from the second touch electrodes 121-1 to 121-*n* in parallel to output them.

The ADC unit 125 converts an amplified detection signal into a digital signal. The signal processing unit 127 processes a plurality of amplified signals converted into digital signals to transfer them to the controller 130.

Next, a touch apparatus operating in the first subperiod T21 of the second period T2 is illustrated.

As illustrated, the amplifiers 112-1 to 112-*m* of the first driver 1110 are connected to the first touch electrodes 111-1 to 111-*m* to output a first driving signal. A second driver 1210 also includes a plurality of amplifiers 122-1 to 122-*n*. The amplifiers 122-1 to 122-*n* are connected to the first touch electrodes 121-1 to 121-*n* to output a third driving signal.

Figure 11:
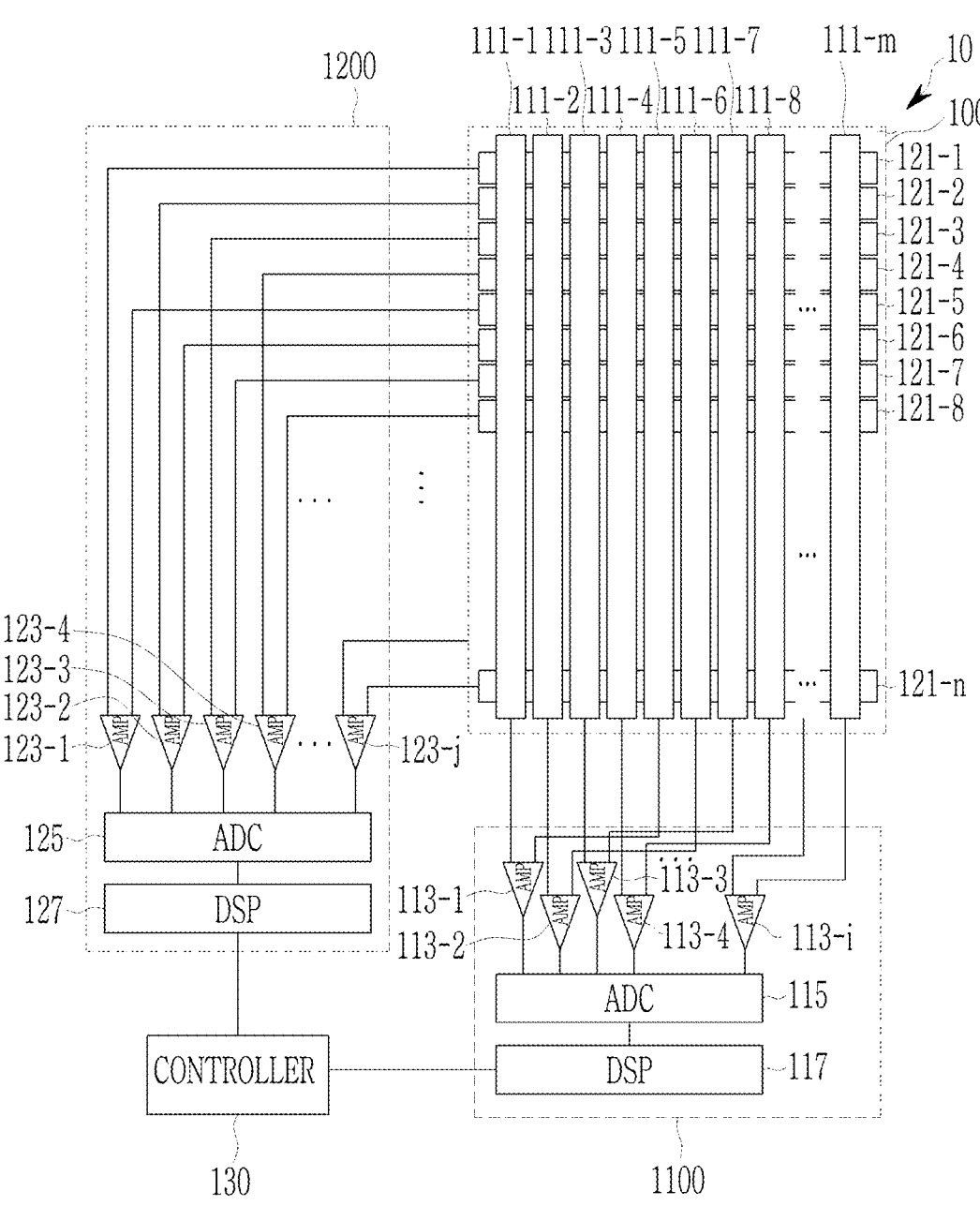

Next, FIG. 11 illustrates a touch apparatus operating in the second subperiod T22 of the second period T2. As illustrated, the first receiver 1100 includes a plurality of differential amplifiers 113-1 to 113-*i*, an ADC unit 115, and a digital signal processor (DSP) 117. The second receiver 1200 includes a plurality of differential amplifiers 123-1 to 123-*j*, an ADC unit 125, and a digital signal processor (DSP) 127.

The differential amplifiers 113-1 to 113-*i* and 123-1 to 123-*j* may be configured by changing the connection of the input terminals of the amplifiers 123-1 to 123-*n*. That is, an inequality i+j≤n may be satisfied. Specifically, two touch electrodes may be connected to one amplifier by connecting an input terminal of two input terminals of the amplifier 123-1 to which the ground or the DC voltage is connected to the corresponding second touch electrode 121-4 and an input terminal of two input terminals of the amplifier 123-1 to which the ground or the DC voltage is connected to the corresponding second touch electrode 121-5.

Input terminals of the respective differential amplifiers 113-1 to 113-*i* and 123-1 to 123-*j* are connected to two touch electrodes that are spaced apart from each other by at least one touch electrode. Each of the differential amplifiers 113-1 to 113-*i* and 123-1 to 123-*j* may differentially amplify and output two sense signals transferred from the touch electrode. Each of the differential amplifiers 113-1 to 113-*i* and 123-1 to 123-*j* receives differential detection signals from two touch electrodes to differentially amplify them, and thus even when a driving signal is applied to a plurality of touch electrodes at the same time, it is not saturated.

Each of the differential amplifiers 113-1 to 113-*i* and 123-1 to 123-*j* may receive detection signals from two touch electrodes that are spaced apart from each other, rather than two adjacent touch electrodes. For example, each of the differential amplifiers 113-1 to 113-*i* and 123-1 to 123-*j* receives a detection signal from two touch electrodes spaced apart from each other with one or more touch electrodes therebetween. In FIG. 11, the differential amplifier 113-1 receives detection signals from the touch electrode 111-1 and the touch electrode 111-5. When the differential amplifier 113-1 receives the detection signals from two adjacent touch electrodes (e.g., the first touch electrode 111-1 and the first touch electrode 111-2), the detection signals caused by the touch in a region between the first touch electrode 111-1 and the first touch electrode 111-2 are not sufficiently large even if they are differentially amplified by the differential amplifier 113-1. Therefore, when the differential amplifier 113-1 is connected with two adjacent touch electrodes, touch sensitivity is deteriorated. However, since the differential amplifier 113-1 receives the detection signals from the first touch electrode 111-1 and the first touch electrode 111-5, the detection signal caused by the touch electrode at the touch input position may be differentially amplified to have a sufficiently large value, and the touch sensitivity may be improved.

Each of the ADC units 115 and 125 converts the differentially amplified detection signal into a digital signal. Each of the signal processing units 117 and 127 processes a plurality of differential amplified signals converted into digital signals to transfer them to the controller 130.

Such a touch detection method will be described together with reference to FIG. 12 to FIG. 16.

Figure 12:
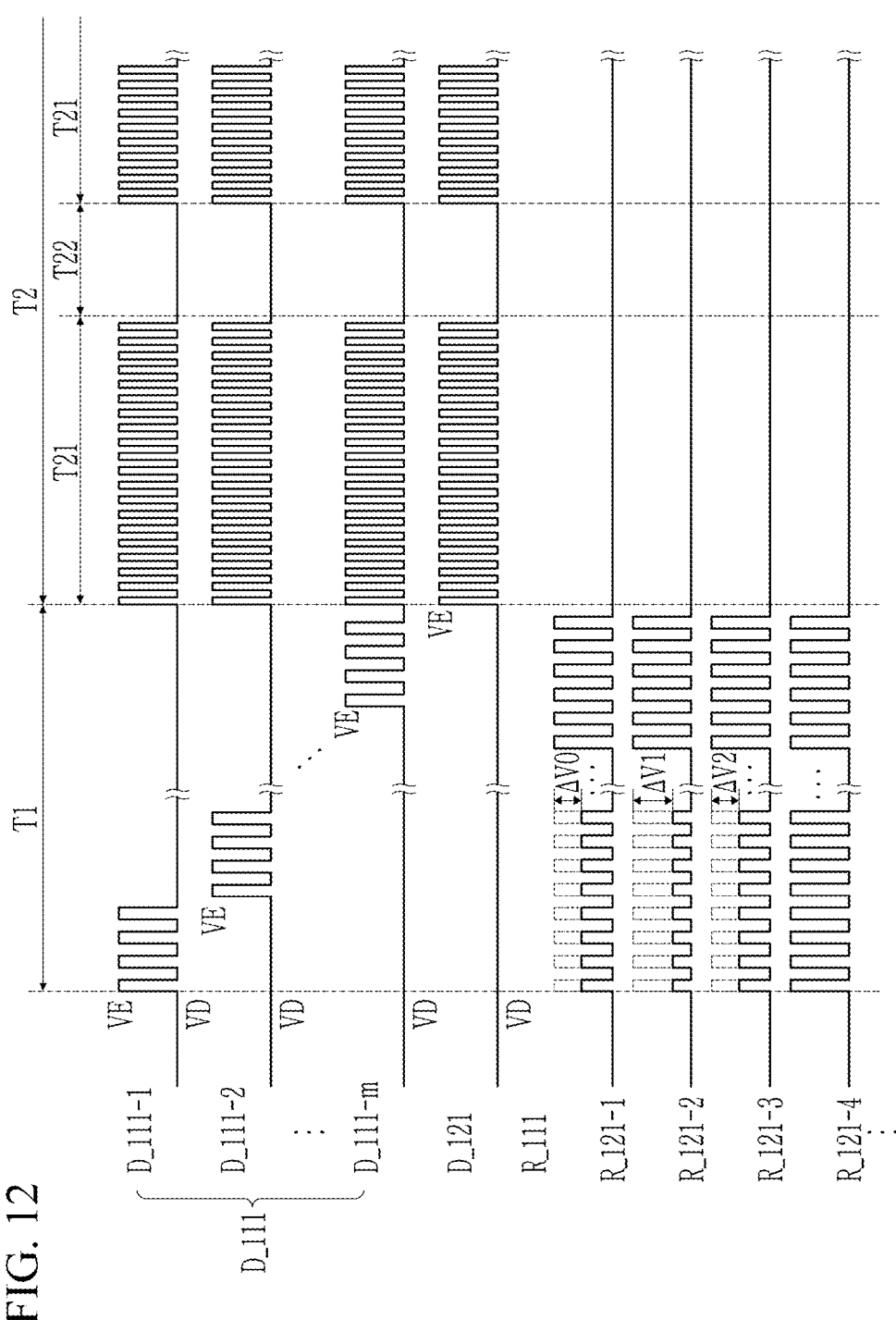
FIG. 12 illustrates a waveform diagram showing an example of a driving signal and a reception signal according to the touch detection method of FIG. 3.
Figure 13:
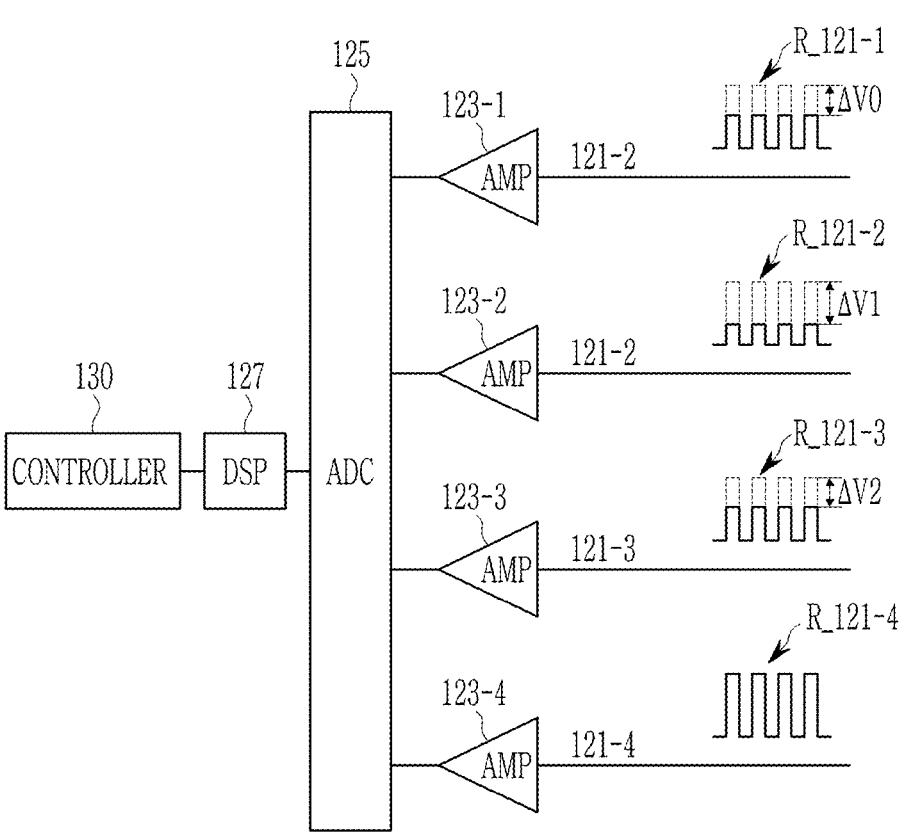
FIG. 13 illustrates a part of a receiver that outputs the reception signal of FIG. 12.

FIG. 12 illustrates a waveform diagram showing an example of a driving signal and a reception signal according to the touch detection method of FIG. 3, and FIG. 13 illustrates a part of a receiver that outputs the reception signal of FIG. 11.

In FIG. 12 and FIG. 13, it is assumed that there is a touch by a finger in a region where the first touch electrodes 111-1 and 111-2 and the second touch electrodes 121-1, 121-2, and 121-3 cross each other.

As illustrated in FIG. 12, during the first period T1, first driving signals D_111-1 to D_111-*m* are sequentially applied to the first touch electrodes 111-1 to 111-*m*. The first driving signals D_111-1 to D_111-*m* are pulse signals having an enable level voltage VE and a disable level voltage VD.

The second receiver 1200 receives the detection signals R_121-1 to R_121-*n* from the second touch electrodes 121-1 to 121-*n*.

The first driving signals D_111-1 to D_111-*m* are driving signals for detecting a touch input by a touch object other than the stylus pen 20, and are not limited to the waveform illustrated in FIG. 12. It is illustrated in FIG. 12 that the first driving signals D_111-1 to D_111-*m* are sequentially applied to the first touch electrodes 111-1 to 111-*m*, but driving signals having different frequencies (e.g., frequencies having an orthogonal relationship with each other) may be simultaneously applied to the first touch electrodes 111-1 to 111-*m*. In this case, the second receiver 1200 may receive detection signals depending on a touch from the second touch electrodes 121-1 to 121-*n*, and may separate the detection signals by the first touch electrodes 111-1 to 111-*m* using band pass filters of different frequency bands.

As illustrated in FIG. 13, the detection signal R_121-1 from the second touch electrode 121-1 may be amplified and outputted through the corresponding amplifier 123-1, the detection signal R_121-2 from the second touch electrode 121-2 may be amplified and outputted through the corresponding amplifier 123-1, the detection signal R_121-3 from the second touch electrode 121-3 may be amplified and outputted through the corresponding amplifier 123-1, and the detection signal R_121 from the second touch electrode 121-4 may be amplified and outputted through the corresponding amplifier 123-1. In the detection signals R_121-1, R_121-2, and R_121-3, a change in signal magnitude caused by a touch occurs as ΔV0, ΔV1, and ΔV2, respectively.

The controller 130 may calculate, as touch coordinates, a point at which the first touch electrodes 111-1 and 111-2 to which a driving signal is applied when a change in signal magnitude is generated, and the second touch electrodes 121-1, 121-2 and 121-3 in which a signal magnitude change is generated, cross each other.

Next, during the first subperiod T21, the second driving signals D_111-1 to D_111-*m* are applied to all of the first touch electrodes 111-1 to 111-*m*, and the third driving signal D_121 is applied to all of the second touch electrodes 121-1 to 121-*n*. The second and third driving signals D_111 and D_121 are pulse signals having a voltage VE of an enable level and a voltage VD of a disable level, and having a frequency similar to that of a resonant frequency of the stylus pen 20.

During the first subperiod T21, reception of detection signals from the first touch electrodes 111-1 to 111-*m* and the second touch electrodes 121-1 to 121-*n* is not performed.

During the second subperiod T22, the first receiver 1100 and the second receiver 1200 may receive detection signals from both the first touch electrodes 111-1 to 111-*m* and the second touch electrodes 121-1 to 121-*n*.

Herein, the second period T2 includes a plurality of first subperiods T21 and second subperiods T22. For example, during the second period T2, a combination of the first subperiod T21 and the second subperiod T22 may be repeated eight times.

In FIG. 11 and FIG. 13, since the touch by the stylus pen 20 does not occur, no detection signal is received during the second subperiod T22.

Figure 14:
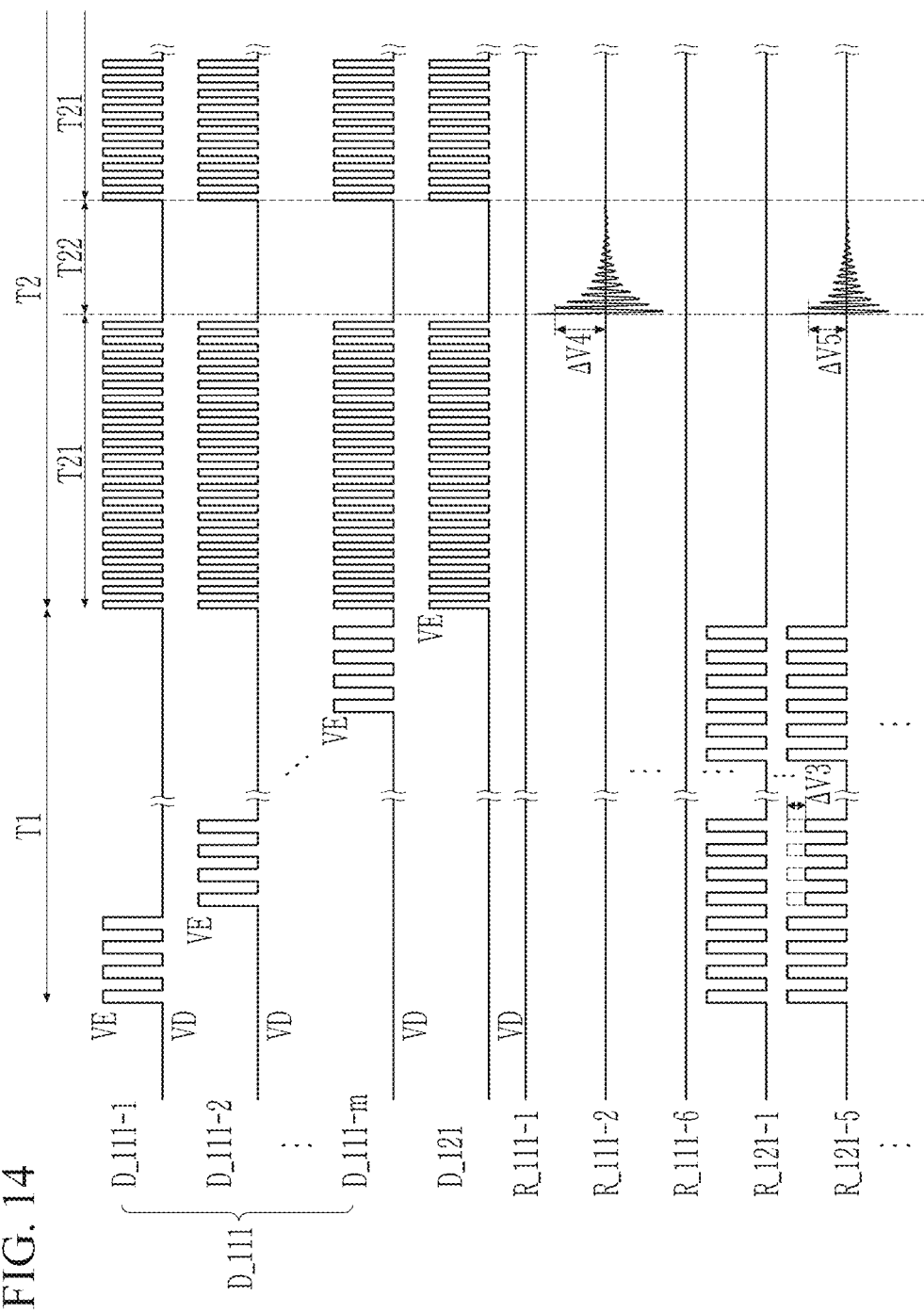
FIG. 14 illustrates a waveform diagram showing another example of a driving signal and a reception signal according to the touch detection method of FIG. 3.
Figure 15:
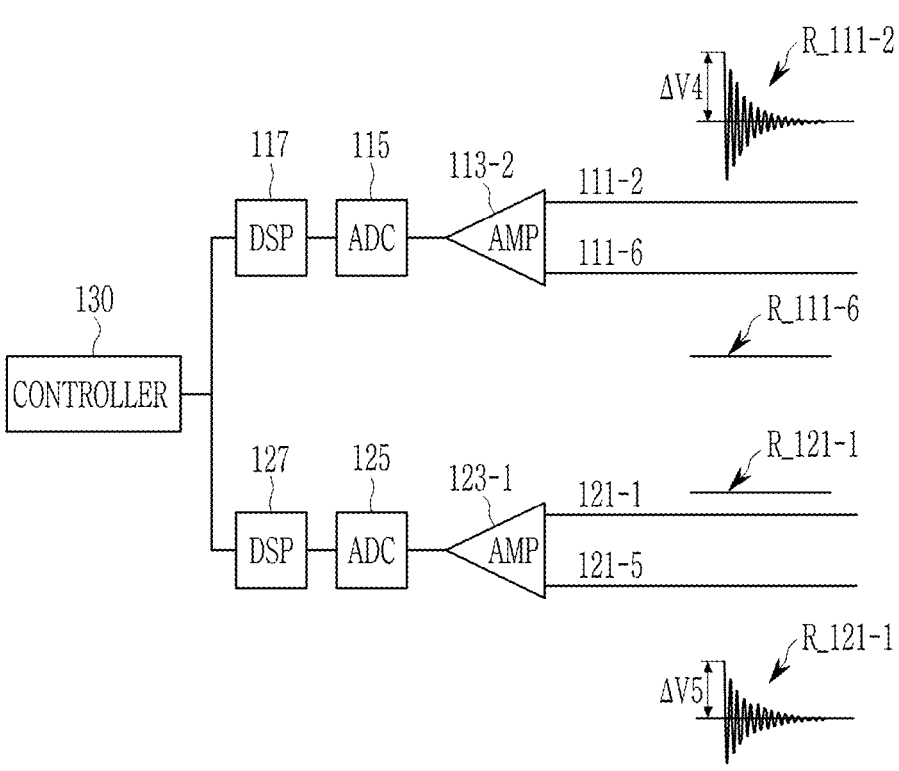
FIG. 15 illustrates a part of a receiver that outputs the reception signal of FIG. 14.

FIG. 14 illustrates a waveform diagram showing another example of a driving signal and a reception signal according to the touch detection method of FIG. 3, and FIG. 15 illustrates a part of a driver that outputs the reception signal of FIG. 14.

In FIG. 14 and FIG. 15, it is assumed that there is a touch by the stylus pen 20 in a region where the first touch electrode 111-2 and the second touch electrode 121-5 cross each other.

As illustrated in FIG. 14, during the first period T1, first driving signals D_111-1 to D_111-*m* are sequentially applied to the first touch electrodes 111-1 to 111-*m*. The second receiver 1200 receives the detection signals R_121-1 to R_121-*n* from the second touch electrodes 121-1 to 121-*n*.

Since the stylus pen 20 is close to the second touch electrode 121-5, a signal magnitude change value ΔV3 of the detection signal R_121-5 from the touched second touch electrode 121-5 may be amplified and outputted through the amplifier 123-5.

Next, during the first subperiod T21 in the second period T2, the second driving signals D_111-1 to D_111-*m* are applied to all of the first touch electrodes 111-1 to 111-*m*, and the third driving signal D_121 is applied to all of the second touch electrodes 121-1 to 121-*n*. The second and third driving signals D_111 and D_121 are pulse signals having a voltage VE of an enable level and a voltage VD of a disable level, and having a frequency similar to that of a resonant frequency of the stylus pen 20.

In FIG. 14, it is described that the enable level voltage VE of the second and third driving signals D_111 and D_121 and the disable level voltage VD are the same in phase signal, but the present invention is not limited thereto. During the first subperiod T21, a magnitude of the pen resonance signal increases according to a time when the second and third driving signals D_111 and D_121 are applied. The magnitude of the pen resonance signal is saturated after a certain time elapses.

During the first subperiod T21, reception of detection signals from the first touch electrodes 111-1 to 111-*m* and the second touch electrodes 121-1 to 121-*n* is not performed.

Thereafter, when the first subperiod T21 ends, the first driver 1110 stops applying the driving signal D_111, and the second driver 1210 stops applying the driving signal D_121. During the second subperiod T22 in the second period T2, the driving signals D_111 and D_121 are not applied to the first touch electrodes 111-1 to 111-*m* and the second touch electrodes 121-1 to 121-*n*.

During the second subperiod T22, the first receiver 1100 and the second receiver 1200 may receive detection signals from both the first touch electrodes 111-1 to 111-*m* and the second touch electrodes 121-1 to 121-*n*. The first receiver 1100 and the second receiver 1200 may receive the pen resonance signal in the second subperiod T22 to which the driving signals D_111 and D_121 are not applied as a detection signal.

As illustrated in FIG. 15, a signal magnitude difference ΔV4 between the detection signal R_111-2 from the first touch electrode 111-2 with touch and the detection signal R_111-6 from the first touch electrode 111-6 without touch may be amplified and outputted through the differential amplifier 113-2. Similarly, a signal magnitude difference ΔV5 between the detection signal R_121-5 from the second touch electrode 121-5 with touch and the detection signal R_121-1 from the second touch electrode 121-1 without touch may be amplified and outputted through the differential amplifier 123-1.

The controller 130 may calculate, as touch coordinates, a point at which the first touch electrodes 111-1 and 111-2 to which a driving signal is applied when a difference in signal magnitude is generated, and the second touch electrodes 121-2 and 121-3 in which a signal magnitude difference is generated, cross each other.

The controller 130 may calculate a touch position on the touch panel 100 through the detection signal received in the second subperiod T22.

In accordance with the touch apparatus 10 according to an exemplary embodiment, since the differential amplifier 113-1 receives the detection signals from the first touch electrode 111-1 and the first touch electrode 111-3 which are spaced apart from each other by at least one touch electrode, the detection signal generated by the touch electrode at the touch input position may be differentially amplified to have a sufficiently large value, and the touch sensitivity may be improved.

In addition, in accordance with the touch apparatus 10 according to an exemplary embodiment, since the detection signal is received through both the first touch electrodes 111-1 to 111-*m* and the second touch electrodes 121-1 to 121-*n* during the second subperiod, there is an advantage in that touch coordinates along two axes intersecting each other may be quickly obtained.

In addition, in accordance with the touch apparatus 10 according to an exemplary embodiment, the same driving signals D_111 and D_121 are simultaneously applied to both the first touch electrodes 111-1 to 111-*m* and the second touch electrodes 121-1 to 121-*n* during the first subperiod T21, thereby improving the resonant signal magnitude of the stylus pen 20 in response thereto.

In the above description, the detection signal may be received at least once during the second subperiod T22 by at least one of the first receiver 1100 and the second receiver 1200. In addition, a time point at which the detection signal is received may be at least one time point in the second subperiod T22, but the present invention is not limited thereto.

Next, the magnitude of the detection signal received in each of the first period T1 and the second period T2 will be described with reference to FIG. 16.

Figure 16:
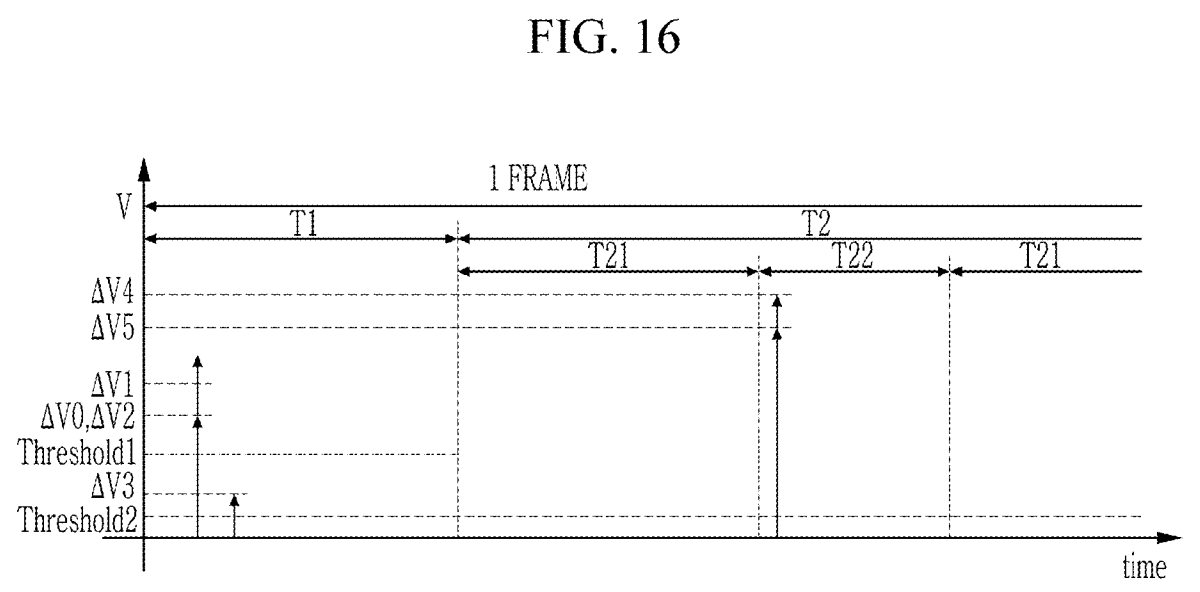

FIG. 16 illustrates a graph showing magnitudes of the reception signals of FIGS. 12 and 14. One frame 1 FRAME includes a first period T1 and a second period T2. The second period T2 includes a plurality of first subperiods T21 and second subperiods T22. When the second subperiod T22 ends, a first period of the next frame is started.

During the first period T1, the magnitude difference of the detection signal by a finger is ΔV1 or ΔV2, which exceeds a first threshold value Threshold1. During the first period T1, the magnitude difference of the detection signal by the stylus pen 20 is ΔV3, which is less than or equal to the first threshold value Threshold1.

According to the exemplary embodiment, the controller 130 determines a detection signal having a magnitude difference exceeding the first threshold value Threshold1 as a valid touch signal during the first period T1. The first threshold value Threshold1 may be set such that a first detection signal by a user's body (a finger, a palm, etc.) is determined as a valid touch signal, and a second detection signal by the stylus pen 20 or a passive stylus pen is filtered.

Accordingly, the controller 130 determines the detection signal by the finger as a valid touch signal, and calculates touch coordinates by using the detection signal. The controller 130 determines that the detection signal by the stylus pen 20 is not a valid touch signal, and does not calculate the touch coordinates.

During the second period T2, the magnitude difference of the detection signal generated by the stylus pen 20 is ΔV4 or ΔV5, which exceeds a second threshold value Threshold2.

The controller 130 determines a detection signal having a magnitude difference exceeding the second threshold value Threshold2 as a valid touch signal during the second period T2. Therefore, the controller 130 determines the detection signal by the stylus pen 20 as a valid touch signal, and calculates touch coordinates by using the detection signal.

Conventionally, when different types of objects contact the touch sensor together, the touch coordinates are calculated using only the detection signal in the first period T1, and thus it is difficult to accurately calculate the touch position by a touch object having a small change in signal magnitude.

According to the exemplary embodiments, the first threshold value Threshold1 may be set such that a first detection signal by a user's body (a finger, a palm, etc.) is determined as a valid touch signal, and a second detection signal by the stylus pen 20 or a passive stylus pen is filtered. As a result, the touch coordinates of the touch object having the large change in signal magnitude may be accurately detected during the first period T1, and the touch coordinates of the touch object having the small change in signal magnitude may be accurately detected during the second period T2.

Next, a touch area depending on a touch object will be described with reference to FIG. 17 and FIG. 18.

Figure 17:
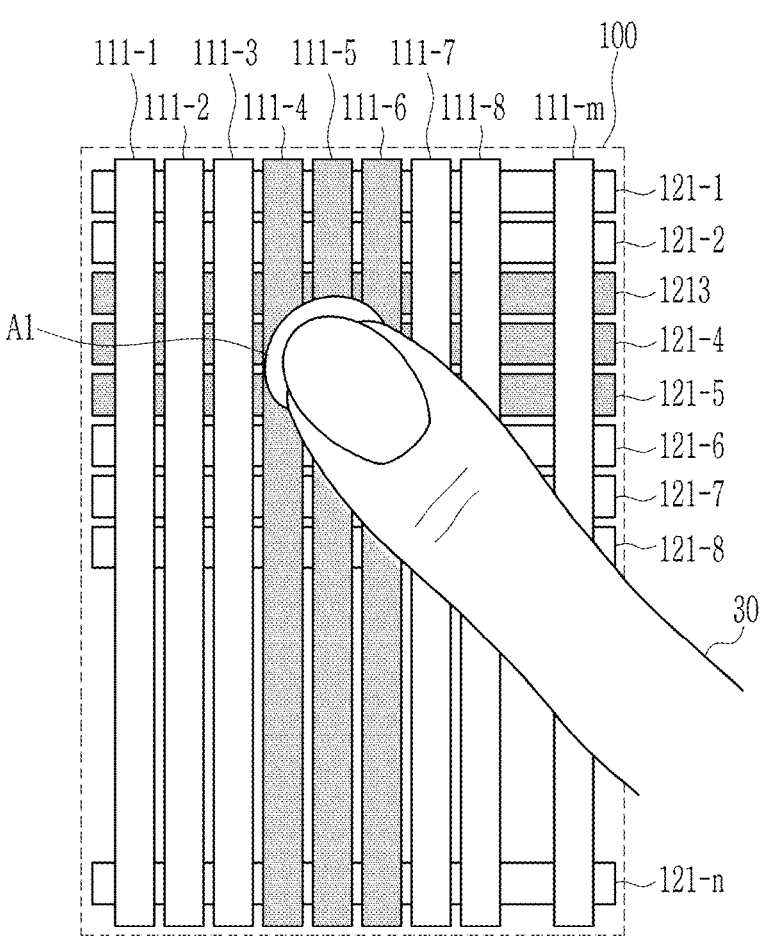
FIG. 17 and FIG. 18 illustrate touch areas of different objects.
Figure 18:
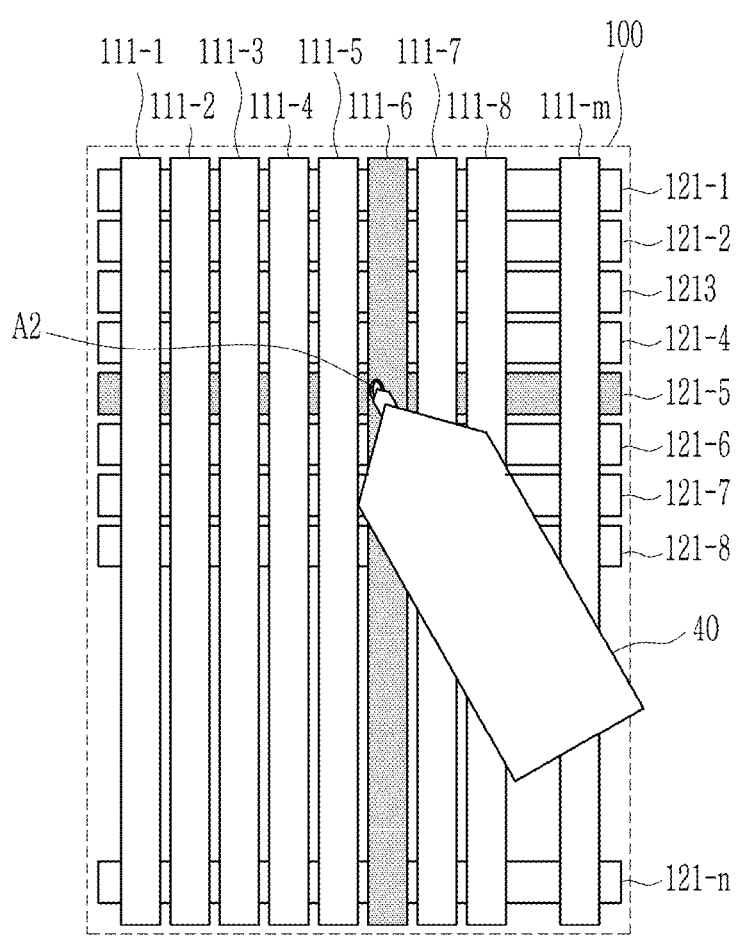

FIG. 17 and FIG. 18 illustrate touch areas of different objects.

As illustrated in FIG. 17, a finger 30 touches the touch panel 100. A plurality of touch electrodes 111-3 to 111-5 and 121-4 to 121-6 may be disposed near an area A1 where a tip of the finger 30 contacts the touch panel 100. An area of the touch area A1 may be calculated by using detection signals received from the touch electrodes 111-3 to 111-5 and 121-4 to 121-6.

As illustrated in FIG. 18, the stylus pen 40 touches the touch panel 100. One first touch electrode 111-6 and one second touch electrode 121-6 may be disposed near an area A2 where a tip of the stylus pen 40 contacts the touch panel 100. Alternatively, two first touch electrodes and two second touch electrodes may be disposed near an area A2 where the tip of the stylus pen 40 contacts the touch panel 100. That is, a number of the touch electrodes disposed in the area A2 where the tip of the stylus pen 40 contacts the touch panel 100 is smaller than that of the touch electrodes disposed in the area A1 where the finger 30 contacts the touch panel 100. Therefore, the area of the touch area A2 caused by the touch of the stylus pen 40 is calculated to be a very small value compared to the touch area A1 caused by the touch of the finger 30.

According to the exemplary embodiments, the touch apparatus 10 may transfer touch data including information related to the area of the touch area to a host apparatus. In this way, the host apparatus may identify whether the touch object is the finger 30 or the stylus pen 40.

According to the exemplary embodiments, the touch apparatus 10 may determine the touch object depending on the calculated area of the touch area, and may transfer touch data including information related to the determined touch object to the host apparatus.

This will be described with reference to FIG. 19 and FIG. 20.

Figure 19:
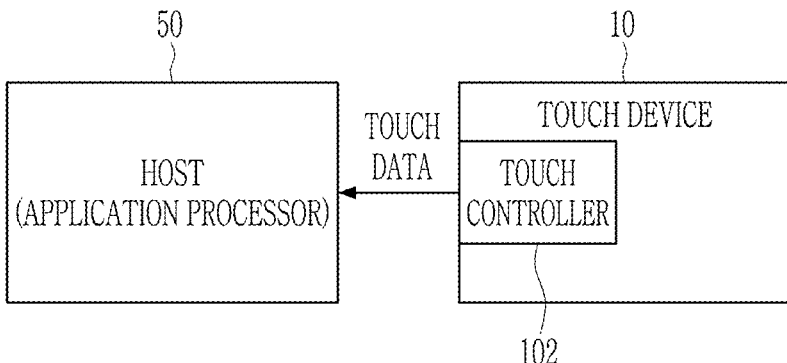
FIG. 19 illustrates a block diagram showing a touch apparatus and a host that perform the driving method of FIG. 3.
Figure 20:
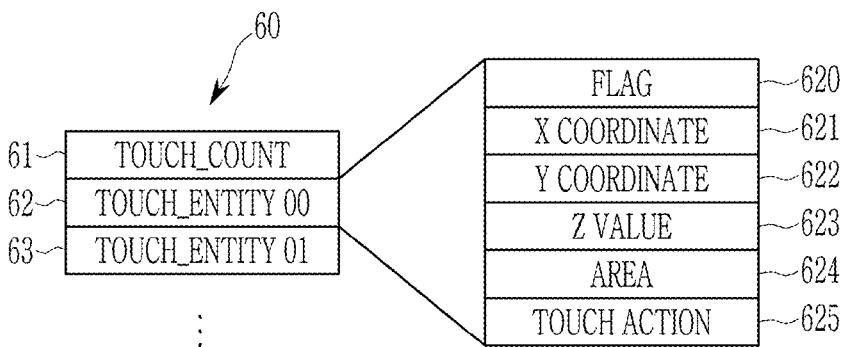
FIG. 20 illustrates an example of touch data provided to a host from a touch apparatus.

FIG. 19 illustrates a block diagram of a manufacturing method of a display device according to an exemplary embodiment, and FIG. 20 illustrates an example of touch data provided to a host from a touch apparatus.

Referring to FIG. 19, a host 50 may receive touch data from the touch controller 102 included in the touch apparatus 10. For example, the host 50 may be a mobile system-on-chip (APC), an application processor (AP), a media processor, a microprocessor, a central processing unit (CPU), or a device similar thereto.

After one frame ends, the touch apparatus 10 may generate information related to the touch input during one frame as touch data to transfer it to the host 50.

Alternatively, when the first period T1 ends, the touch apparatus 10 may generate touch information that is inputted during the first period T1 as touch data to transfer it to the host 50, and when the second period T2 that is continuous to the first period T1 ends, it may generate information related to a touch that is inputted during the second period T2 as touch data to transfer it to the host 50.

Referring to FIG. 20, touch data 60 may include a touch count field 61 and one or more touch entity fields 62 and 63.

In the touch count field 61, a value indicating a number of touches that are inputted during one frame period may be written. For example, when touch coordinates of one finger are calculated during the first period T1 in one frame period, and when touch coordinates of one stylus pen are calculated during the second period T2, a value indicating that two touches are inputted is written in the touch count field 61.

The touch entity fields 62 and 63 include fields indicating information related to each touch input. For example, the touch entity fields 62 and 63 may include a flag field 620, an X-axis coordinate field 621, a Y-axis coordinate field 622, a Z-value field 623, an area field 624, and a touch action field 625.

A number of the touch entity fields 62 and 63 may be equal to a value written in the touch count field 61.

A value representing a touch object may be written in the flag field 620. For example, a finger, a palm, and a stylus pen may be filled in the flag field 620 with different values. Values representing the calculated touch coordinates may be written in the X-axis coordinate field 621 and the Y-axis coordinate field 622. A value corresponding to the signal strength of the detection signal may be written in the Z-value field 623. A value corresponding to an area of the touched area may be written in the area field 624.

According to exemplary embodiments, the host apparatus 50 receiving touch data 60 determines that a touch object is the finger 30 when the touch area is larger than the threshold by using the value of the area field 624, and determines that the touch object is the stylus pen 40 when the touch area is less than or equal to the threshold.

According to the exemplary embodiments, the host apparatus 50 receiving the touch data 60 may identify whether the touch object is the finger 30 or the stylus pen 40 by using the value of the flag field 620.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch system comprising:
a touch apparatus configured to output a first driving signal of a first frequency and a second driving signal of a second frequency, wherein the second frequency is different from the first frequency; and
a stylus pen including a resonant circuit configured to resonate with the second driving signal and output a resonance signal;
wherein the touch apparatus comprises:
a touch panel including a plurality of first touch electrodes arranged in a first direction and a plurality of second touch electrodes arranged in a second direction crossing the first direction;
a driver configured to apply the first driving signal to the first touch electrodes during a first period and the second driving signal to the first touch electrodes and/or the second touch electrodes during a second period subsequent to the first period; and
a receiver configured to receive a detection signal from the second touch electrodes during the first period, and the resonance signal from the first touch electrodes and the second touch electrodes during a third period subsequent to the second period,
wherein the touch apparatus is further configured to generate a touch data based on the detection signal and/or the resonance signal in a frame, and
wherein the frame includes the first period and a plurality of the second periods and a plurality of the third periods, each of the plurality of the second periods and the plurality of the third periods alternates.

2. The touch system of claim 1, further comprising:
a controller configured to determine the detection signal as a valid touch signal in the first period based on whether a signal strength of the detection signal exceeds a first threshold during the first period, and determine the resonance signal as a valid touch signal in the second period based on whether signal strength of the resonance signal exceeds a second threshold, wherein the first threshold is greater than the second threshold.

3. The touch system of claim 2, wherein
the detection signal includes at least one of a first detection signal generated by a first touch object and a second detection signal generated by the stylus pen.

4. The touch system of claim 3, wherein
the first threshold is set to filter the second detection signal.

5. The touch system of claim 3, wherein
the first touch object includes at least one of a finger and a palm.

6. The touch system of claim 1, wherein
the second frequency is higher than the first frequency.

7. The touch system of claim 1, wherein
the first driving signal is a pulse signal of the first frequency.

8. The touch system of claim 1, wherein
the second driving signal is a pulse signal of the second frequency.

9. The touch system of claim 1, wherein
the receiver includes an amplifier connected to each of the second touch electrodes during the first period and configured to amplify and output the detection signal from a corresponding second touch electrode.

10. The touch system of claim 1, wherein
the driver is further configured not to apply the second driving signal to the first touch electrodes and the second touch electrodes during the third period.

11. The touch system of claim 1, wherein
the receiver includes a plurality of differential amplifiers configured to receive the resonance signal from both the first touch electrodes and the second touch electrodes simultaneously during the third period.

12. The touch system of claim 11, wherein
the differential amplifiers include:
a first differential amplifier configured to receive the detection signal from two first touch electrodes spaced by at least one first touch electrode; and
a second differential amplifier configured to receive the detection signal from two second touch electrodes spaced by at least one second touch electrode.

13. The touch system of claim 1, wherein
the resonant circuit is further configured to resonate with a magnetic field signal induced from the second driving signal.

14. The touch system of claim 1, wherein
the resonant circuit is further configured to resonate with an electric field signal induced from the second driving signal.

15. The touch system of claim 1, wherein
the resonance signal has the second frequency.

16. The touch system of claim 1, wherein
the stylus pen includes a passive stylus pen.

17. The touch system of claim 1, wherein
the second period and the third period are repeated alternately after the first period.

* * * * *